US006656297B2

(12) United States Patent
Schneider et al.

(10) Patent No.: US 6,656,297 B2
(45) Date of Patent: Dec. 2, 2003

(54) METHOD FOR APPLYING A NARROW WEB ZIPPER TRANSVERSE TO THE FILM DIRECTION

(75) Inventors: John H. Schneider, Frankfort, IL (US); Basil Carl Linton, Loganville, GA (US); Eric Joseph Fenzl, Loganville, GA (US); Ronald Cortigiano, Sr., Toccoa, GA (US)

(73) Assignee: Illinois Tool Works Inc., Glenview, IL (US)

( * ) Notice: Subject to any disclaimer, the term of this patent is extended or adjusted under 35 U.S.C. 154(b) by 217 days.

(21) Appl. No.: 09/956,193

(22) Filed: Sep. 19, 2001

(65) Prior Publication Data

US 2003/0051791 A1 Mar. 20, 2003

(51) Int. Cl.[7] ................................................ B32B 31/20

(52) U.S. Cl. ...................... 156/66; 156/308.2; 156/552; 156/582; 156/583.1; 493/927

(58) Field of Search ................................ 156/66, 308.2, 156/308.4, 552, 556, 580, 581, 582, 583.1; 493/213, 214, 215, 927

(56) References Cited

U.S. PATENT DOCUMENTS

| | | | | | |
|---|---|---|---|---|---|
| 4,655,862 | A | * | 4/1987 | Christoff et al. | 156/66 |
| 4,709,398 | A | * | 11/1987 | Ausnit | 383/63 |
| 5,279,693 | A | * | 1/1994 | Robinson et al. | 383/63 |
| 5,322,579 | A | * | 6/1994 | Van Erden | 156/66 |
| 5,529,659 | A | * | 6/1996 | Ellsworth et al. | 156/552 |
| 6,212,857 | B1 | * | 4/2001 | Van Erden | 53/412 |

* cited by examiner

*Primary Examiner*—James Sells
(74) *Attorney, Agent, or Firm*—Pitney, Hardin, Kipp & Szuch LLP

(57) ABSTRACT

The apparatus and method uses grooved rollers and a grooved guide plate to position zipper segments on a web. The web is subsequently formed into a cylinder in a form fill and seal apparatus and seal bar assemblies form the bottom transverse seal, the web is indexed and the cylinder is filled, and the seal bar assemblies form the top transverse seal simultaneously with the bottom transverse seal of a subsequent bag. A zipper seal bar completes the sealing of the zipper segment to a second side of the web and a knife extends from a slot in a seal bar assembly to separate the completed bag from the web. This apparatus and method is particularly adapted to narrow zipper segments.

21 Claims, 10 Drawing Sheets

METHOD FOR APPLYING A NARROW WEB ZIPPER TRANSVERSE TO THE FILM DIRECTION

BACKGROUND OF THE INVENTION

1. Field of the Invention

The present invention pertains to method for applying a zipper to a web, particularly a relatively narrow zipper in a direction transverse to the film direction in a form fill and seal apparatus.

2. Description of the Prior Art

In the prior art, form fill and seal apparatus and methods are known. While these methods and apparatus have been extremely successful for the high speed packaging of various kinds of foodstuffs, improvement is desired with respect to the application of narrow zippers in the direction transverse to the direction of the film. More particularly, improvement is desired with respect to the handling of narrow zippers during installation.

SUMMARY OF THE INVENTION

The present invention provides an applicator which uses a series of grooved rollers or a grooved guide plate to trap the zipper as it is being fed across the web. When in position, the web momentarily stops to allow the seal bar to tack the zipper to the film from below the film. The rollers and guide plate act as an anvil to provide pressure from the seal bar. The rollers, guide plate and seal bars then retract to allow the film to index forward. After the cylindrical shape of the bag or other container has been formed, the bottom and top bag seal jaws close. The zipper seal bars then apply heat and pressure to the zipper to tack and seal the zipper to both sides of the bag.

More particularly, a guide system is used to guide and move the zipper in a precise position perpendicular or transverse to the direction of the web. This system of rollers provide positive tensioning to the zipper by increasing the speed over the zipper feed roller. It also allows a wide range of lengths to be fed because there will always be at least one roller in contact with the zipper. The roller assembly will further retract from the zipper guide plate to allow the zipper, which is attached to the film at the station, to travel with the film without interference.

Additionally, seal bar assemblies are used with a first seal bar for forming the upper transverse seal on a package along with a second seal bar for forming the lower transverse seal on a subsequent package.

DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
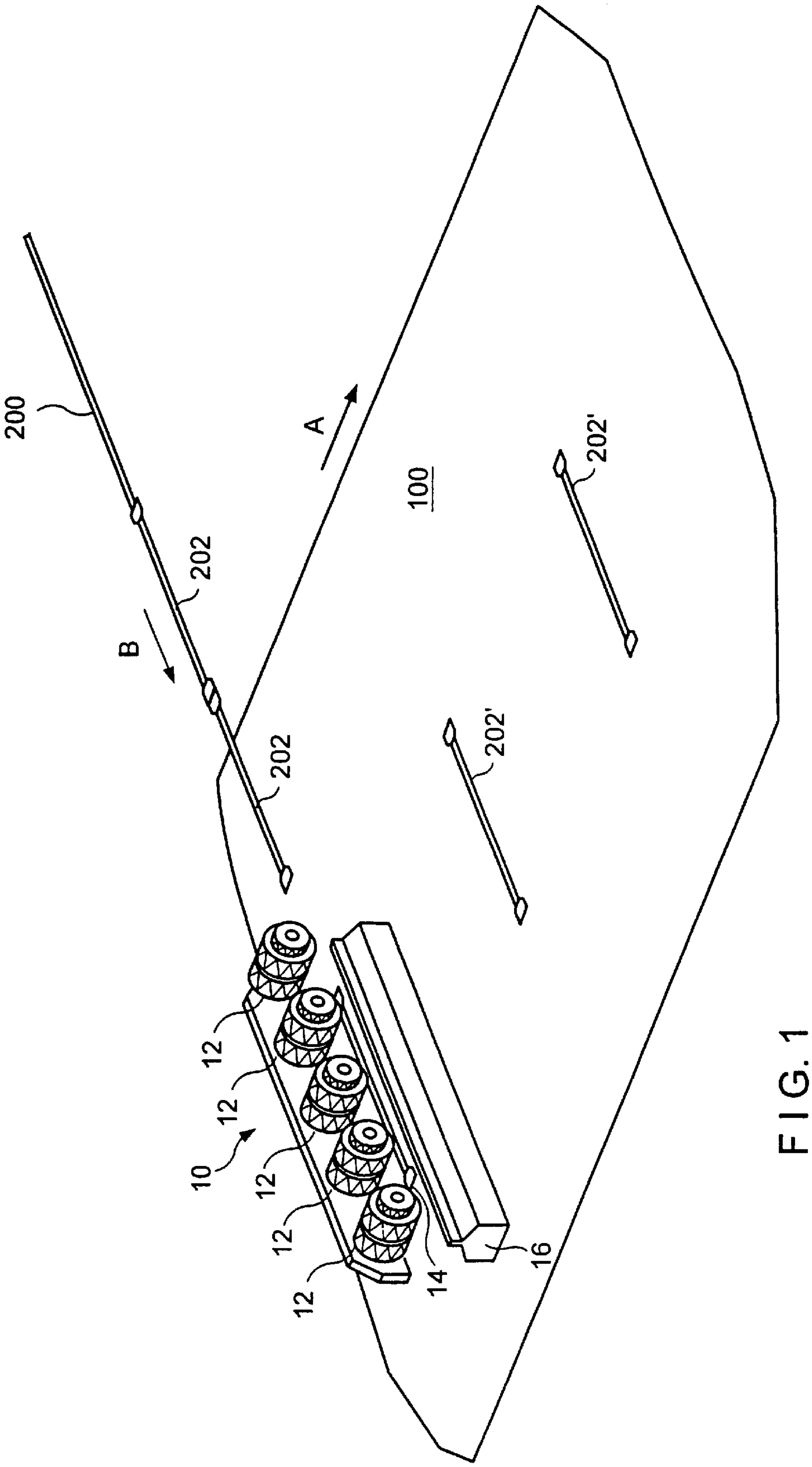
FIG. 1 is a perspective view showing the applicator for the zipper, using grooved rollers.

Referring now to the drawings in detail wherein like numerals refer to like elements throughout the several views, FIG. 1 is a perspective view of the web 100 which is running in the direction indicated as A in the environment of a form fill and seal apparatus. A length of zipper material 200 is fed in the direction indicated as B, which is transverse to the direction indicated as A. Zipper material 200 includes successive zipper segments 202. Zipper material 200 is further envisioned as being relatively narrow. Installed zipper segments 202' are further shown as having been previously tacked to web 100. Zipper material 200 is positioned by applicator 10 which includes a series of grooved rollers 12 with axes of rotation substantially parallel to the direction indicated as A. Applicator 10 drives and positions zipper material 200 and further includes guide plate 14 which may similarly be grooved.

Figure 2:
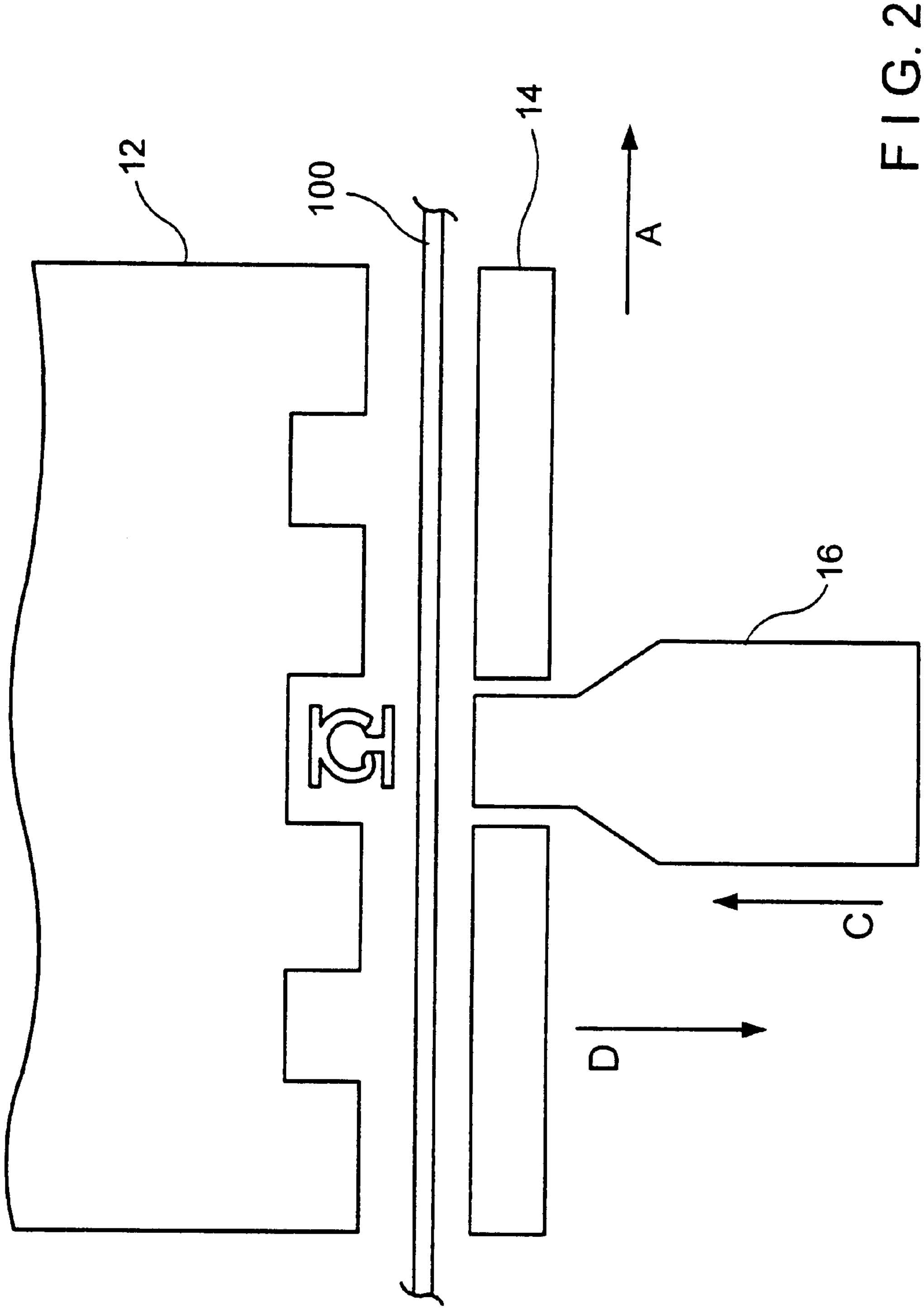
FIG. 2 is a plan view showing the positioning of the guide plate with respect to the guide rollers.

As depicted by FIG. 2, seal bar 16 is positioned underneath web 100, opposing grooved rollers 12 and guide plate 14. When web 100 is in the proper position for application of a zipper segment 202, web 100 momentarily stops to allow seal bar 16 to tack-seal the zipper segment to the web 100 from below the web 100. Grooved rollers 12 and guide plate 14 act as an anvil for seal bar 16 and remain in a static position as seal bar 16 is urged against the underside of web 100, in the direction indicated as C. Seal bar 16 is then retracted in the direction indicated as D. By retracting seal bar 16, web 100 is allowed to index forward in direction A.

Rather than tack-sealing, a sealing part of the lower zipper base at seal bar 16 could be used to increase the inside opening force of the bag. Such a system would be more suited to double-string zippers, compression post zippers or other wider construction zippers. Sealing the remaining areas of the zipper base is described below.

Applicator 10 may be enhanced by providing a system of rollers providing positive tension on zipper segment 202' by increasing its speed over that of the zipper feed roller. This also allows a wide window of zipper lengths to be fed because at least one roller will be in contact with the zipper segment 202'. The roller assembly would retract from the zipper guide plate to allow the zipper segment 202', which is attached to the web 100 at this station, to travel with the web 100 without any interference.

Figure 3:
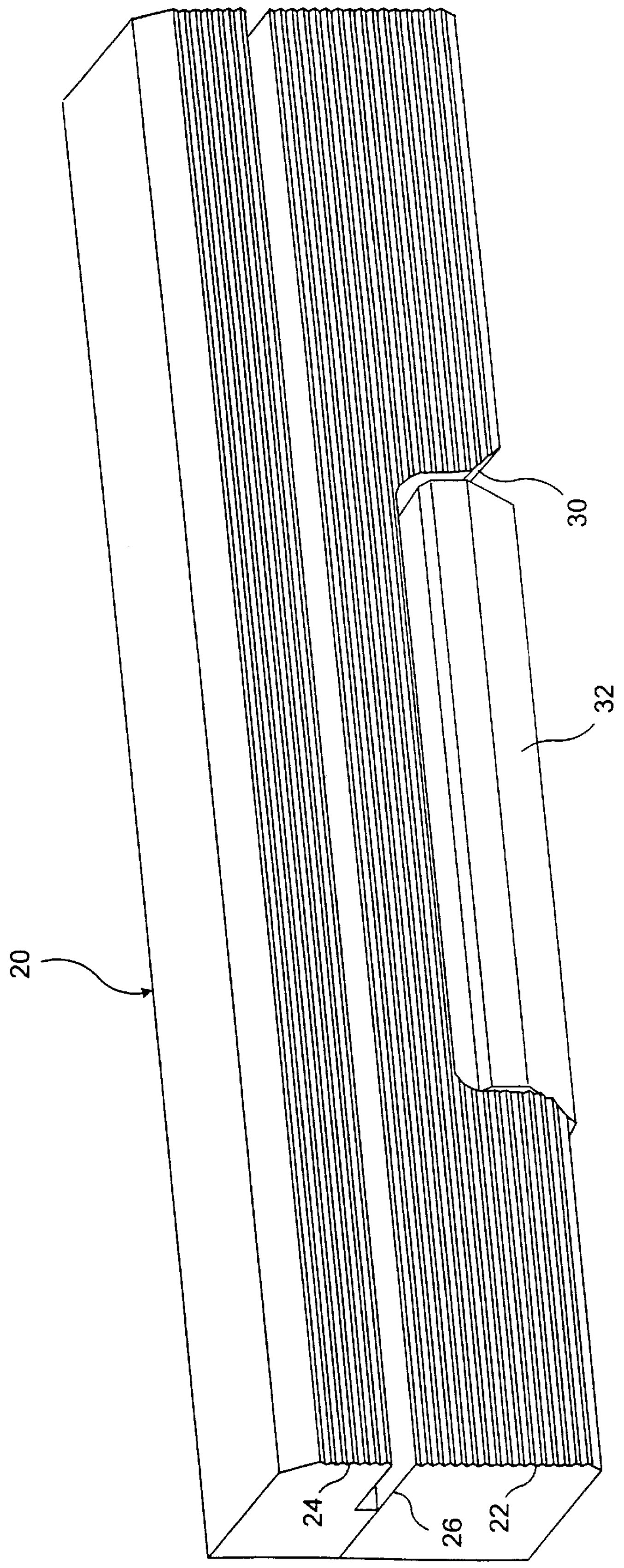
FIG. 3 is a perspective view of the top seal bar, bottom seal bar and zipper seal bar of the present invention.

The form fill and seal apparatus then forms the web into a cylindrical shape and fills and seals in the sequence shown in FIGS. 4–8. Similarly, FIG. 3 shows the seal bar assembly 20 used in this sequence. Two opposing seal bar assemblies 20, 20' are used as shown in FIGS. 5–8.

The lower portion of seal bar assembly 20 includes a top bag forming seal bar 22 for forming the top transverse seal 302 (see FIGS. 4–8) of a bag 300 substantially simultaneously with the formation of a bottom transverse seal 304' on a subsequent bag 300' by bag bottom forming seal bar 24 which is formed on an upper portion of seal bar assembly 20.

When zipper seal bars 32 are used where part of the lower zipper base has previously been sealed by the seal bar 16 to increase the inside opening force of the bag; the portions of seal bars 32 in contact with the previously sealed areas will remain unheated. Opposing zipper seal bars 32 should be wide enough to seal the entire base of the zipper, in order to differentiate between the remaining sections of the base and the partially (hinged) sealed section.

In both circumstances of sealing the bag, slot 26 is formed between top bag forming seal bar 22 and bag forming bottom seal bar 24. Slot 26 of seal bar assembly 20' includes a knife blade 28 which extends and retracts therefrom. Slot 26 of seal bar assembly 20 provides a path into which knife blade 28 can extend and retract.

Recess 30 is centrally located within top seal bar 22. Zipper seal bar 32 extends and retracts from recess 30.

Zipper seal bars 32 are large enough in the machine direction to allow for proper sealing of the zipper segment 202', which is envisioned to be relatively narrow, to the opposite bag wall given the ability of the apparatus to properly feed the bag film the length of the package. Therefore, during the manufacture of several consecutive packages, different regions of zipper seal bars 32 may perform the sealing operation. Zipper seal bars 32 are designed to close to a point sufficient to seal the zipper segment 202' to the opposite bag wall. However, if a sensor (not shown) is used to sense the position of the zipper segment 202', this may be used to reduce the sealing area of the zipper seal bars 32 in the machine direction. Zipper seal bars 32 may be designed to limit the pressure applied to the zipper during sealing thereby avoiding deformation of the zipper. Zipper seal bars 32 may also be designed to the full length of the seal bar 20, allowing a full-length zipper for the width of the bag. The zipper seal bar 32, depicted in FIG. 2, would provide a bag with a zipper that is shorter than the width of the bag and where the rest of the bag is sealed closed.

Figure 4A:
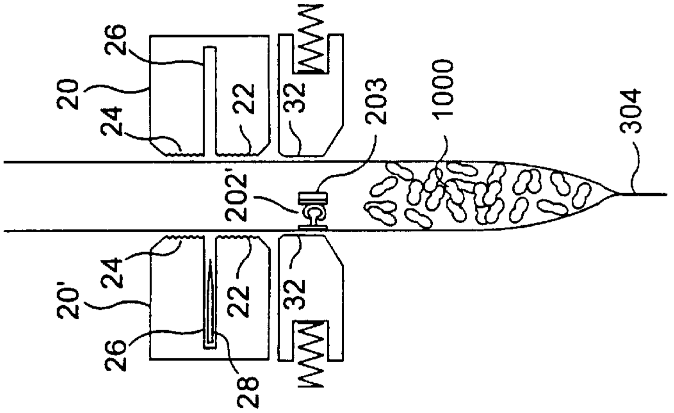
FIGS. 4*a*–4*d* are plan views showing the sequence of the operation of the present invention in a form fill and seal apparatus.
Figure 4B:
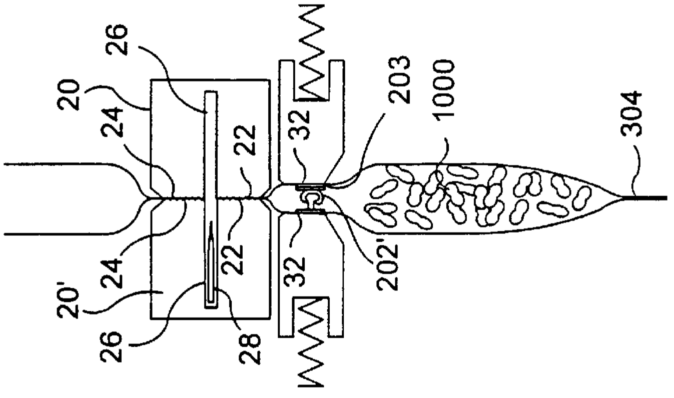

Furthermore, the zipper segment 202' may include a sealing bridge 203' that aids in quick sealing and prevents damage to the zipper lock members. Such damage may be caused when sealing the zipper to film directly behind zipper lock members. The sealing bridge 203' as shown in FIG. 4*b* is a buffer strip of sealable material pre-attached to zipper segment 202'. As shown in FIG. 4*a*, sealing bridge 203' would be on the face of zipper segment 202' which permanently seals as a result of zipper seal bars 32. The sealing bridge 203' may be used in any area where zipper segment 202' attaches or seals to the bag structure.

Similarly, the back side of the zipper segment 202' may be designed to seal to the film in a manner that increases the product side opening force. The zipper segment 202' may also contain a tamper evident feature such as a peel seal or a joined web. Additionally, the top bag forming seal bar 22 may be designed to create an easy open feature such as a shaped seal with a tear notch.

As can be seen from FIGS. 5–8, seal bar assembly 20' is driven by pneumatic cylinder 40, or a similar mechanical or electromechanical device, to reciprocate to and from the position that engages web 100, while seal bar assembly 20 is illustrated as stationary. Seal bar assembly 20' may be spring-loaded in order to aid in retraction. However, seal bar assembly 20 may likewise be driven by a pneumatic cylinder or similar mechanical or electromechanical device. Likewise, zipper seal bars 32 are driven to reciprocate to and from the position engaging web 100 by pneumatic cylinders 42, or similar mechanical or electromechanical devices. The device built to move zipper seal bars 32 may be designed to limit the pressure applied to the zipper in order to prevent deformation of the zipper.

Figure 5:
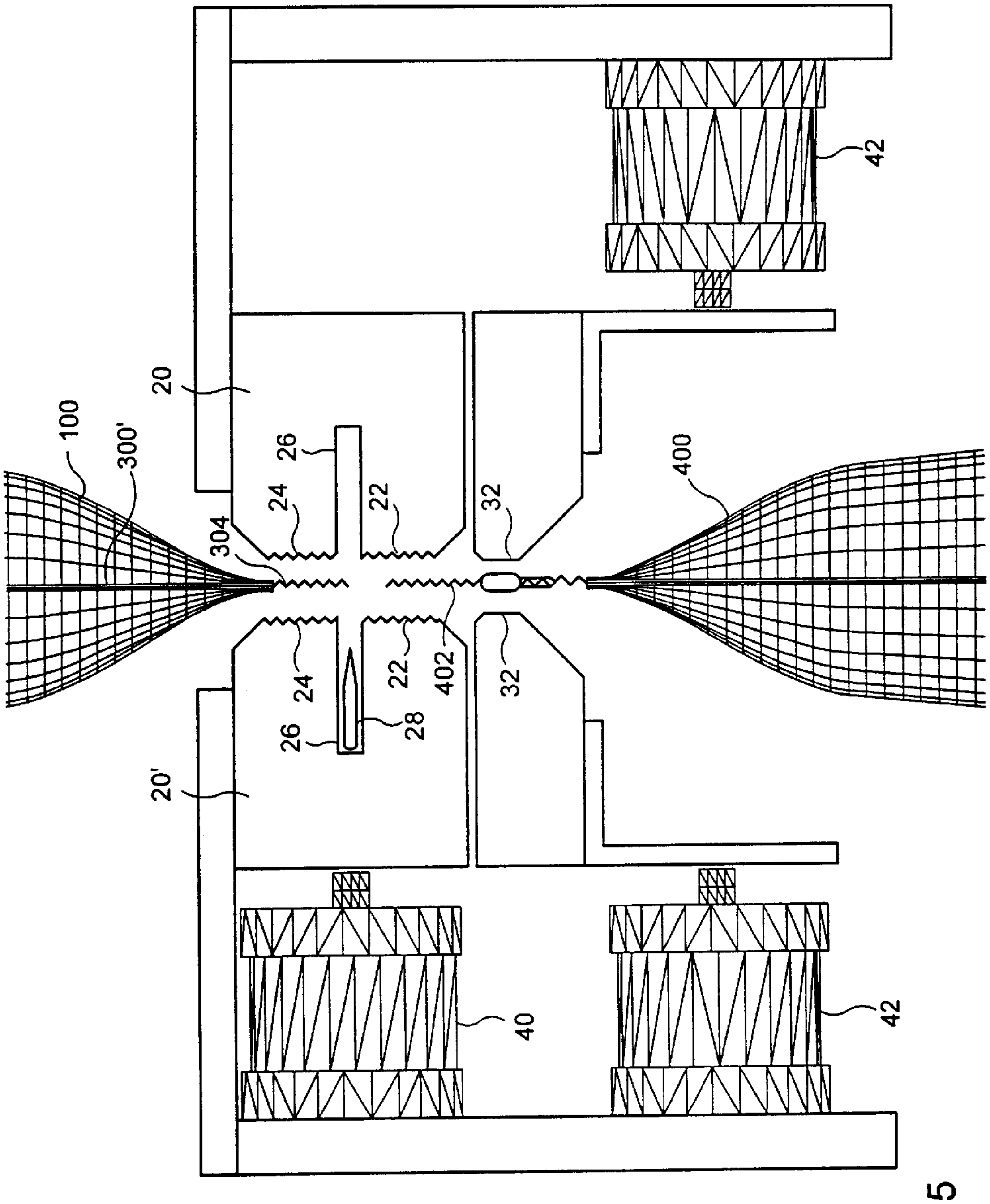
FIG. 5 is a plan view showing the position of the various seal bars after a prior bag has been completed and is falling away, and the present bag is ready to be indexed into position for filling and sealing.
Figure 6:
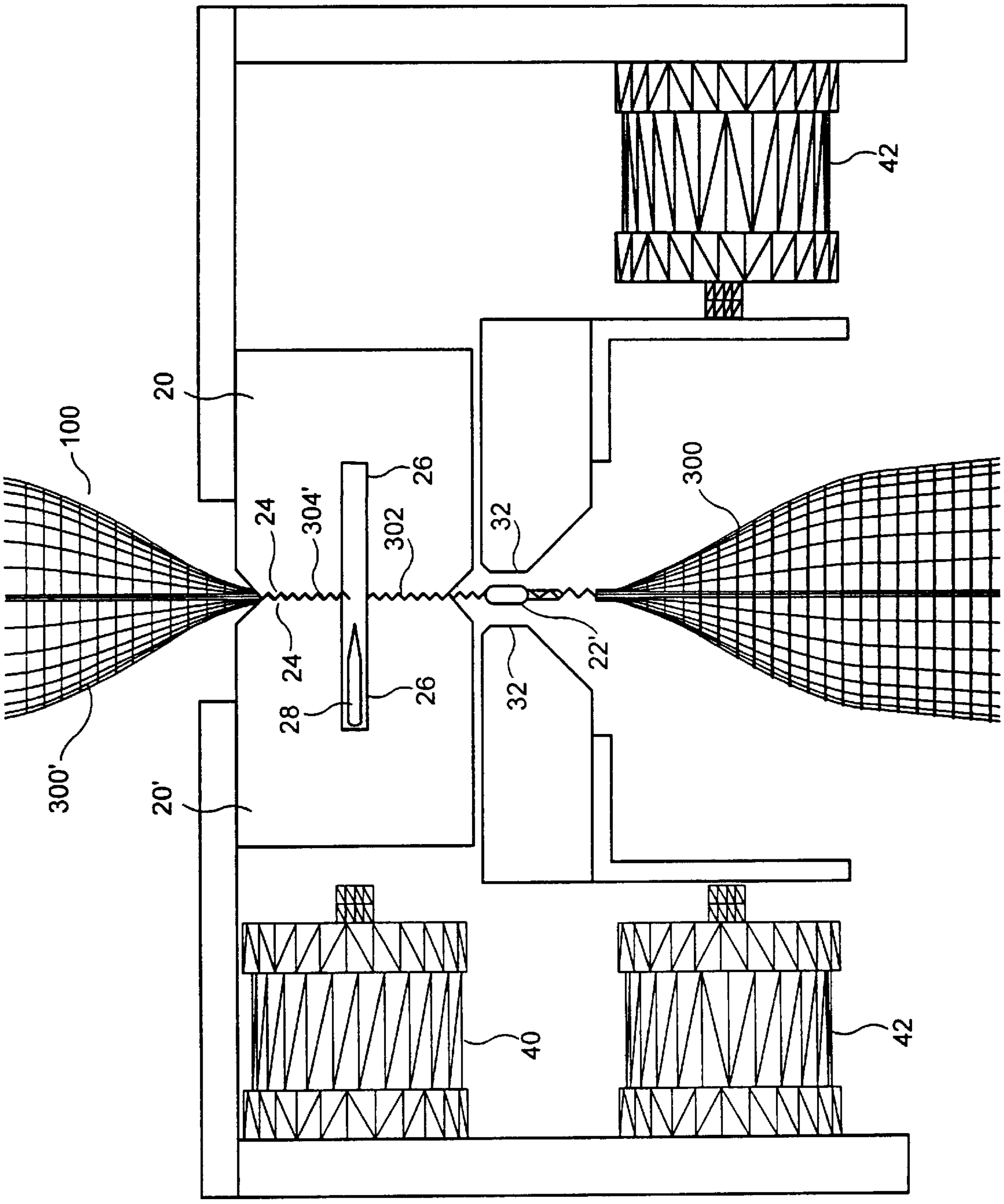
FIG. 6 is a plan view showing the position of the various seal bars after the present bag of the FIG. 5 has been indexed into position and filled, with one seal bar forming an upper transverse seal in present bag and another seal bar forming a lower transverse seal in the subsequent bag.

The typical sequence of events is as follows. A prior bag 400 falls away as shown in FIG. 5. Top transverse seal 402 of prior bag 400 has been formed simultaneously with bottom transverse seal 304 of bag 300 by the prior operation of seal bars 22, 24. Web 100 is indexed downwardly to the position shown in FIG. 4*a* and filled with foodstuffs or similar contents 1000. At this point, zipper segment 202' has been previously tacked to one side of web 100. Seal bar assembly 20' is then driven by pneumatic cylinder 40 to engage web 100 between seal bar assemblies 20 and 20' as shown in FIG. 6. Top seal bars 22 form the top transverse seal 302 while bottom seal bars 24 form the bottom transverse seal 304' of subsequent bag 300'.

Figure 7:
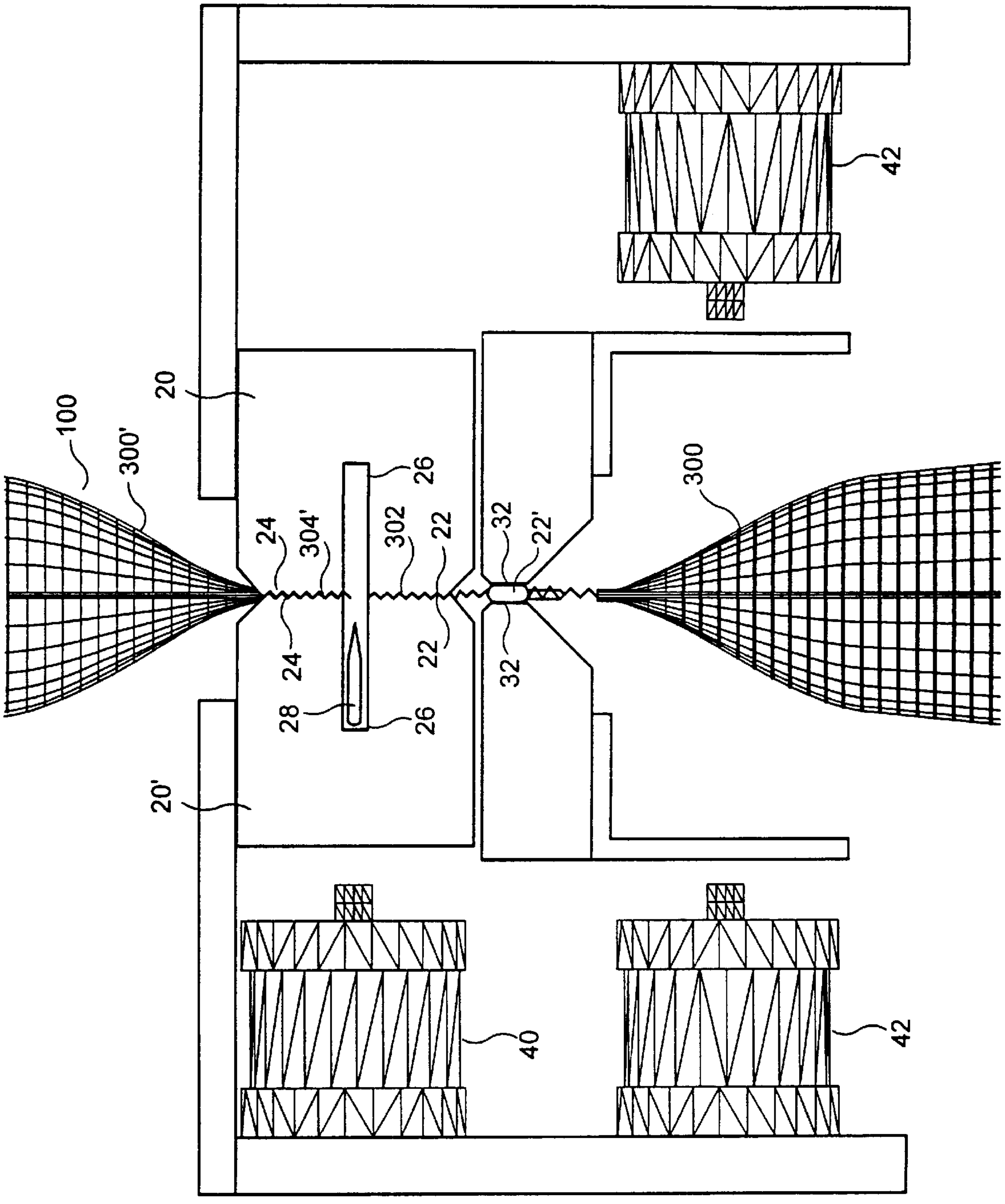
FIG. 7 is a plan view showing the position of the zipper seal bar completing the sealing the zipper to the web on the top of the present bag.

Subsequent to or simultaneously with the formation of transverse seals 302, 304', pneumatic cylinders 42 drive zipper seal bars 32 together thereby engaging zipper segment 202' and a portion of web 100 therebetween as shown in FIGS. 4*b* and 7 thereby permanently sealing zipper segment 202' to both sides of web 100.

Figure 4C:
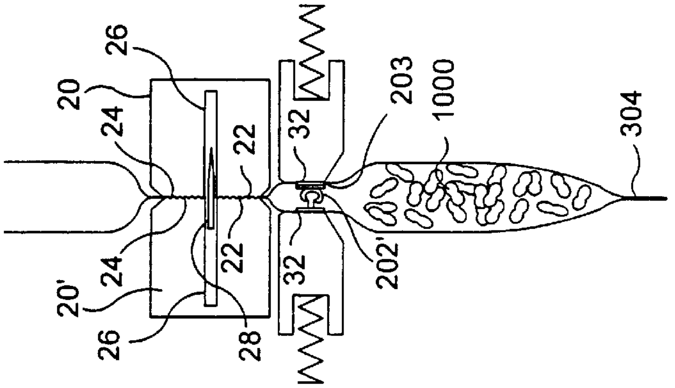
Figure 4D:
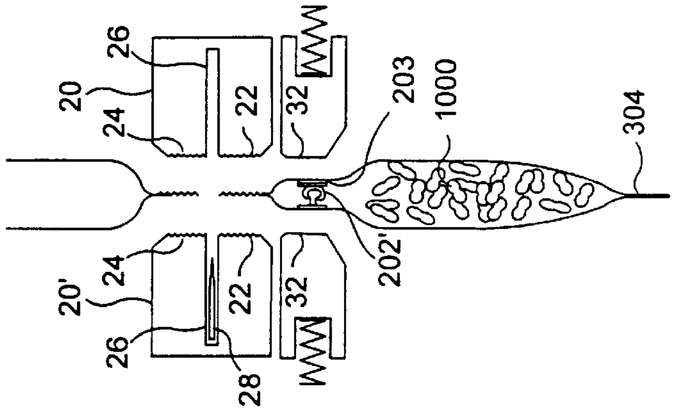
Figure 8:
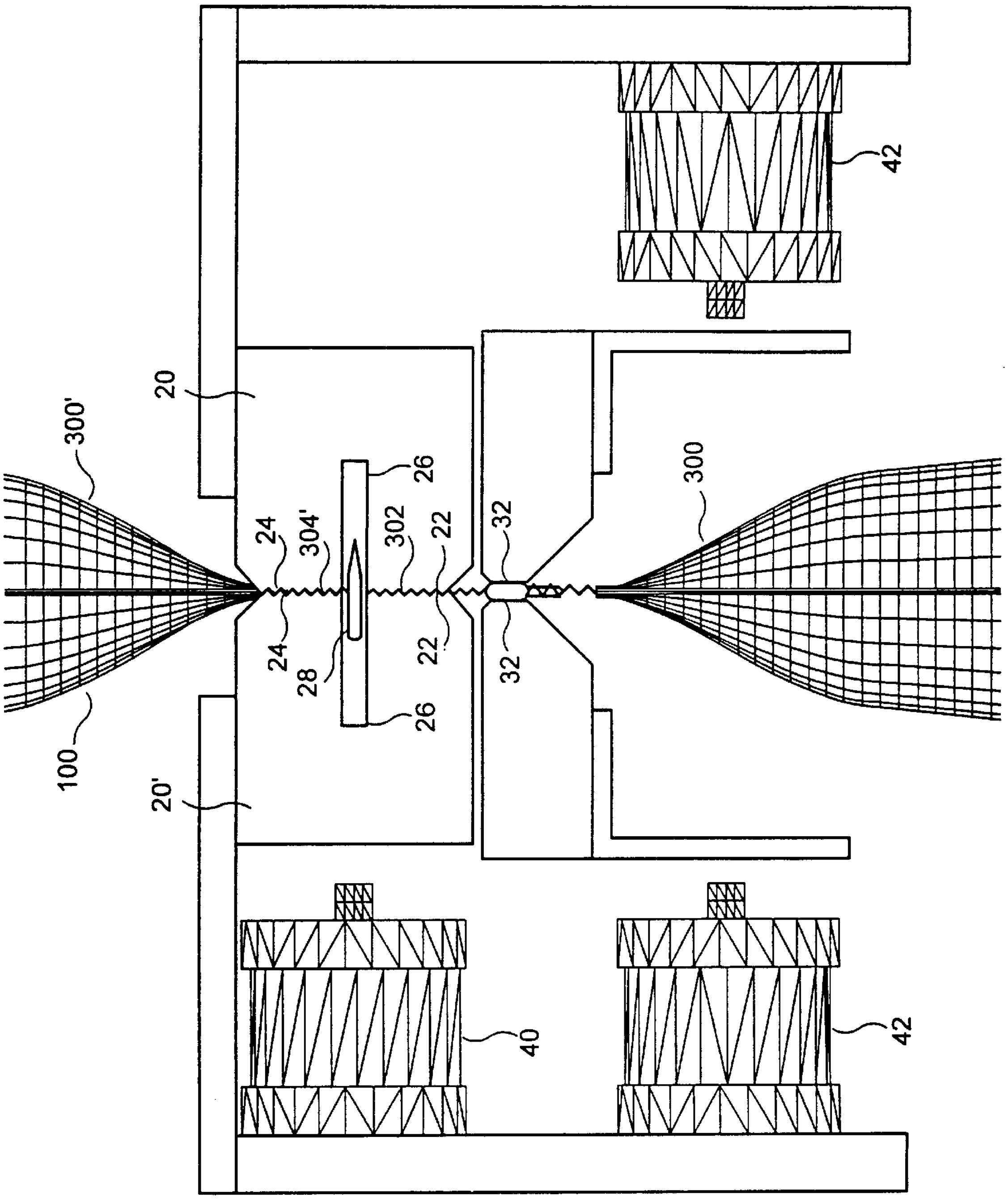
FIG. 8 is a plan view showing the position of the various seal bars as the knife separates the present bag from the subsequent bag, in preparation for the present bag falling away as shown in FIG. 5 after the various seal bars are retracted.
Figure 9:
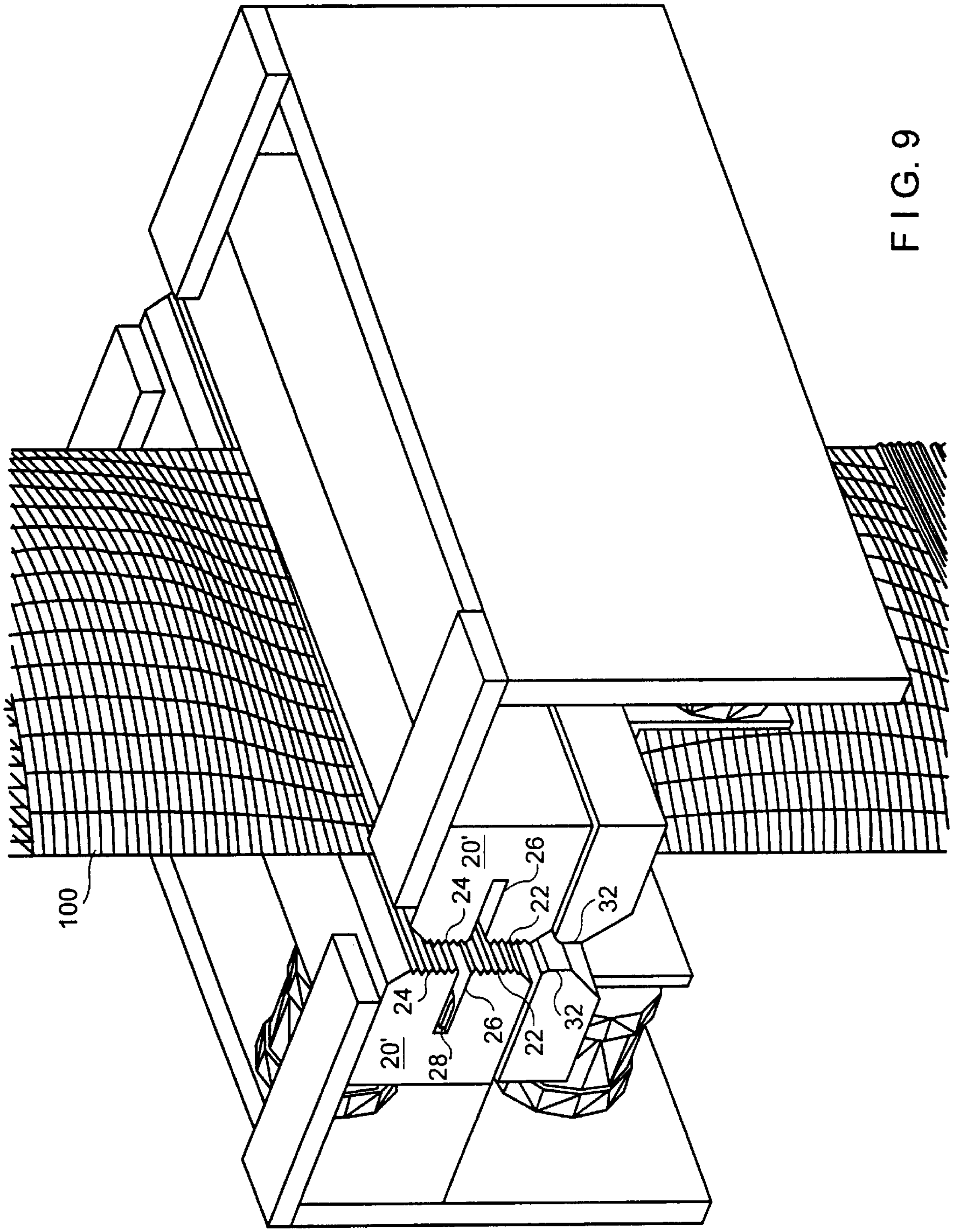
FIG. 9 is a perspective view of the web running between the separated seal bars, similar to the configuration shown in FIG. 5.
Figure 10:
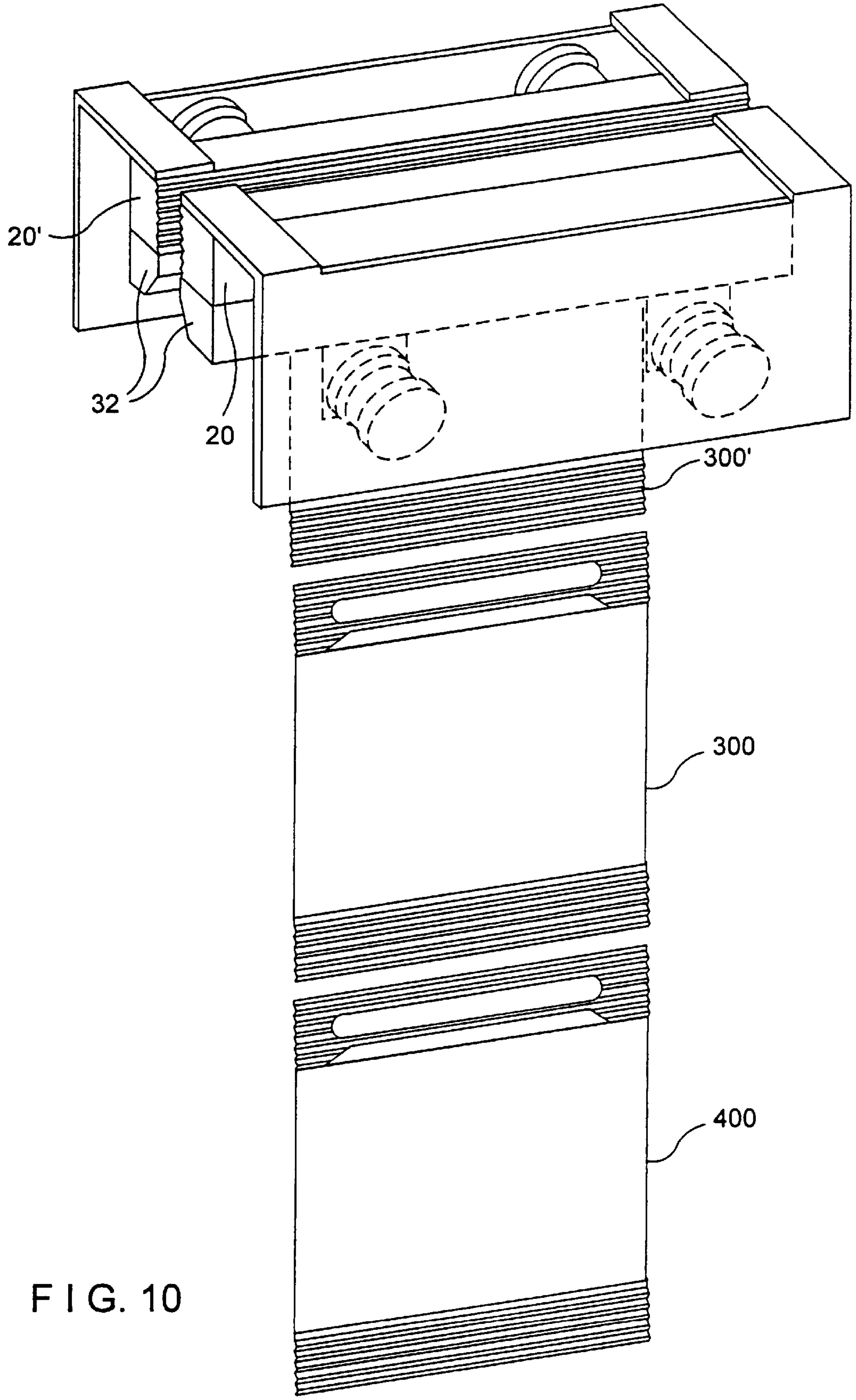
FIG. 10 is a perspective view of the web with several successive bags running between the separated seal bars.

Knife 28 then extends from slot 26 of seal bar assembly 20' partially into slot 26 of seal bar assembly 20 thereby separating bag 300 from web 100 as shown in FIGS. 4*c* and 8. Seal bar assemblies 20, 20' retract away from each other, knife 28 is retracted into slot 26 of seal bar assembly 20', and zipper seal bars 32 are retracted from each other as shown in FIG. 4*d*. Filled bag 300 then falls away in the same manner that prior bag 400 fell away in FIG. 5.

A variation on this apparatus and method would manufacture unfilled pre-made pouches without forming bottom transverse seal 304 in order to allow subsequent filling and sealing.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A method for applying at least one side of a zipper to a traveling web comprising the steps of:

indexing the web into a desired position;

using grooved rollers to position the zipper on the web, the zipper being transverse to a direction of travel of the web;

momentarily pausing the web;

applying a sealing bar so as to engage the web and the zipper between the grooved rollers and the sealing bar to tack-seal the zipper on the web; and resuming travel of the web.

2. The method of claim 1 further comprising the step of retracting said grooved rollers prior to the step of resuming travel of the web.

3. The method of claim 2 further including the step of using a grooved guide plate in combination with the step of using grooved rollers to position the zipper.

4. An applicator for applying at least one side of a zipper to a web including:

grooved rollers to position the zipper on the web, the zipper being transverse to a direction of travel of the web; and a sealing bar which engages the web and zipper between said grooved rollers and said sealing bar to tack the zipper on the web.

5. The applicator of claim 4 further including a grooved guide plate acting in combination with said grooved roller to position the zipper on the web.

6. The applicator of claim 4 wherein said grooved rollers have axes of rotation which are substantially parallel to a direction of travel of the web.

7. The applicator of claim 4 further including a retracting device for retracting said rollers after the zipper is tacked to the web.

8. A sealing device for a form fill and seal apparatus including:

a first seal bar assembly and a second seal bar assembly, each seal bar assembly including a first seal bar for forming an upper transverse seal on a first container; a second seal bar for forming a lower transverse seal on a second container, said second container being subsequent to said first container; a zipper seal bar recessed within said first seal bar; and a slot formed between said first seal bar and said second seal bar;

wherein said first and second seal bar assemblies moves in extending and retracting relative relationship with each other.

9. The sealing device of claim 8 further including a blade which moves from a retracted position within said slot of said first seal bar assembly to an extended position wherein a portion of said blade extends into said slot of said second seal bar assembly thereby separating a first container from a second container.

10. The sealing device of claim 9 wherein said second seal bar is over said first seal bar.

11. The sealing device of claim 8 wherein said first and second sealing bars have a machine direction depth substantially greater than a width of the zipper.

12. The sealing device of claim 8 wherein said first and second seal bars operate simultaneously with each other and said zipper seal bars operate subsequently to operation of said first and second seal bars.

13. The sealing device of claim 8 wherein said first and second seal bars operate simultaneously with each other and said zipper seal bars operate simultaneously with operation of said first and second seal bars.

14. The sealing device of claim 8 wherein pressure between said first and second seal bar assemblies is limited thereby avoiding excessive pressure and deformation of portions of the containers.

15. An apparatus for applying at least one side of a zipper to a traveling web comprising:

means for indexing the web into a desired position;

grooved rollers to position the zipper on the web, the zipper being transverse to a direction of travel of the web;

means for momentarily pausing the web;

means for applying a sealing bar so as to engage the web and the zipper between the grooved rollers and the sealing bar to tack the zipper on the web; and means for resuming the travel of the web.

16. The sealing device of claim 8, wherein said zipper sealing bar is capable of differentiating sections of a zipper that require sealing.

17. The sealing device of claim 8, further including a sensor wherein said sensor identifies a position of a zipper on said first container with said sensor further coordinating where said zipper seal bar operates, such that a sealing area of said zipper seal bar is reduced.

18. An apparatus for applying at least one side of a zipper to a traveling web comprising:

means for indexing the web into a desired position;

grooved rollers to position the zipper on the web, the zipper being transverse to a direction of travel of the web;

means for momentarily pausing the web;

means for applying a sealing bar so as to engage the web and the zipper between the grooved rollers and the sealing bar to seal a lower half of the zipper on the web; and means for resuming travel of the web.

19. A method for applying at least one side of a zipper to a traveling web comprising the steps of:

indexing the web into a desired position;

using grooved rollers to position the zipper on the web, the zipper being transverse to the direction of travel of the web;

momentarily pausing the web;

applying a sealing bar so as to engage the web and the zipper between the grooved rollers and the sealing bar to seal a portion of a lower half of the zipper onto the web thereby providing a greater inside bag opening force when the zipper is used as part of a reclosable bag; and resuming travel on the web.

20. The method of claim 19 further comprising the step of retracting said grooved rollers prior to the step of resuming travel of the web.

21. The method of claim 19 further including the step of using a grooved guide plate in combination with the step of using grooved rollers to position the zipper.

* * * * *